United States Patent
Tcherchian et al.

(10) Patent No.: US 9,948,678 B2
(45) Date of Patent: Apr. 17, 2018

(54) METHOD AND SYSTEM FOR GATHERING AND CONTEXTUALIZING MULTIPLE EVENTS TO IDENTIFY POTENTIAL SECURITY INCIDENTS

(71) Applicant: Xypro Technology Corporation, Simi Valley, CA (US)

(72) Inventors: Stephen Tcherchian, Simi Valley, CA (US); Noel Mabugat, West Hills, CA (US); Jorge Alonzo, Valencia, CA (US); Rayna Burgess, Calabasas, CA (US); Scott Uroff, Northridge, CA (US)

(73) Assignee: Xypro Technology Corporation, Simi Valley, CA (US)

( * ) Notice: Subject to any disclaimer, the term of this patent is extended or adjusted under 35 U.S.C. 154(b) by 0 days.

(21) Appl. No.: 14/923,841

(22) Filed: Oct. 27, 2015

(65) Prior Publication Data

US 2017/0118245 A1    Apr. 27, 2017

(51) Int. Cl.
*H04L 29/06* (2006.01)
*G06F 21/50* (2013.01)

(52) U.S. Cl.
CPC .............. *H04L 63/20* (2013.01); *G06F 21/50* (2013.01); *H04L 63/1416* (2013.01)

(58) Field of Classification Search
CPC ............................ H04L 63/20; H04L 63/1416
See application file for complete search history.

(56) References Cited

U.S. PATENT DOCUMENTS

| 6,704,874 B1* | 3/2004 | Porras ................. H04L 12/2602 709/224 |
| 2003/0037284 A1* | 2/2003 | Srinivasan ................ H04L 1/22 714/11 |
| 2007/0033157 A1* | 2/2007 | Gray ................. G06F 17/30371 |
| 2007/0143842 A1 | 6/2007 | Turner et al. |

(Continued)

FOREIGN PATENT DOCUMENTS

| EP | 2811714 A2 | 12/2014 |
| KR | 20030035142 | 5/2003 |
| WO | 2015009296 A1 | 1/2015 |

OTHER PUBLICATIONS

Kotenko, Igor and Andrey Chechulin. Attack Modeling and Security Evaluation in SIEM Systems, Laboratory of Computer Security Problems. Dec. 2012. Internation Transactions on Systems Science and Applications SIWN Press vol. 8 pp. 129-147.*

(Continued)

*Primary Examiner* — Catherine Thiaw
*Assistant Examiner* — Wayne An
(74) *Attorney, Agent, or Firm* — Sheppard Mullin; Daniel Yannuzzi; Jonathan Marina

(57) ABSTRACT

A method and system for aggregating and correlating disparate and unrelated events to enable faster security event detection. A plurality of event logs generated by a number of disparate, unrelated, independent components of a fault-tolerant server and platform-specific data are contextualized through the use of a security context map, enabling unrelated events to be correlated to identify security incidents indicative of security threats. User- or system-generated rules may (Continued)

then be applied to the contextualized data to enable more sophisticated security breach identification.

15 Claims, 9 Drawing Sheets

(56) References Cited

U.S. PATENT DOCUMENTS

| | | | |
|---|---|---|---|
| 2008/0040790 A1* | 2/2008 | Kuo | G06F 21/604 726/12 |
| 2009/0113531 A1* | 4/2009 | Emmerich | H04L 63/20 726/6 |
| 2014/0007241 A1* | 1/2014 | Gula | H04L 63/1433 726/25 |
| 2014/0013434 A1* | 1/2014 | Ranum | H04L 63/145 726/24 |
| 2016/0021122 A1* | 1/2016 | Pevny | H04L 63/1408 726/23 |
| 2016/0036844 A1* | 2/2016 | Kopp | H04L 63/1425 726/1 |

OTHER PUBLICATIONS

International Search Report and Written Opinion for Corresponding PCT Application No. PCT/US2016/057404 dated Jan. 24, 2017.

\* cited by examiner

METHOD AND SYSTEM FOR GATHERING AND CONTEXTUALIZING MULTIPLE EVENTS TO IDENTIFY POTENTIAL SECURITY INCIDENTS

TECHNICAL FIELD

The disclosed technology relates generally to information technology security management, and more particularly, some embodiments relate to aggregating system data from disparate data sources and contextualizing the data to provide more intelligent information technology security.

DESCRIPTION OF THE RELATED ART

Systems and processes that are vital to the operation of businesses are known as mission, or business, critical. Such systems or processes are identified based on the importance of the system or process to the organization's "mission," such that a failure of such system or process would greatly impact the total business operation. Mission critical systems are present in many enterprises, such as stock exchanges, banking, and telecommunications, which require mission critical systems to operate continually without fault, i.e., require extremely high uptime.

BRIEF SUMMARY OF EMBODIMENTS

According to various embodiments of the disclosed technology, a method and system for aggregating events and information associated with a fault-tolerant server are provided that enables correlation of disparate and unrelated events. Platform-specific data is retrieved, in addition to security event logs, to provide context for evaluating different system events, enabling identification of patterns of disparate events indicative of a security incident. Unlike current analysis tools that provide per event analysis, embodiments of the technology disclosed herein takes advantage of the additional information available in mission critical systems to provide a more comprehensive type of security analysis through the use of contextualization to create security incidents tying together actions and events that previously would fail to trigger a security alert.

According to an embodiment of the disclosed technology, a method is provided for generating threat assessment rules that associate disparate events together, as opposed to relying on per event rules and counters. The method comprises collecting a plurality of event logs generated by a plurality of disparate and unrelated components of a fault-tolerant server; scanning data items of the fault-tolerant server to retrieve a plurality of platform-specific data to provide context; analyzing the plurality of event logs in context due to the platform-specific data; and generating a security context map for use in determining if a security incident is ongoing.

According to an embodiment of the disclosed technology, a system is provided comprising: a fault-tolerant server comprising a plurality of data items and a plurality of disparate and unrelated components; a platform-specific data collector communicatively coupled to one or more communication ports of the fault-tolerant server and configured to scan a plurality of data items associated with the fault-tolerant server and retrieve a plurality of platform-specific data; an enterprise service bus communicatively coupled to one or more communication ports of the fault-tolerant server and configured to collect a plurality of event logs generated by the plurality of disparate and unrelated components of the fault-tolerant server over the one or more communication ports of the fault-tolerant server; a security context engine communicatively coupled to the service bus and configured to contextualize a plurality of unassociated events data by applying a security context map to identify one or more security incidents, the plurality of unassociated events data comprising the plurality of platform specific data and the plurality of event logs; an analysis engine communicatively coupled to the service bus and configured to compare one or more security incidents against one or more threat assessment rules associated with the fault-tolerant server; and a database communicatively coupled to the service bus; wherein the service bus routes messages between each of the components of the system; and wherein a security context map represents a relationship between one or more unassociated events identified in the plurality of event logs generated by the disparate and unrelated components, and the analysis engine is configured to compare one or more security incidents against one or more threat assessment rules associated with the fault-tolerant server.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
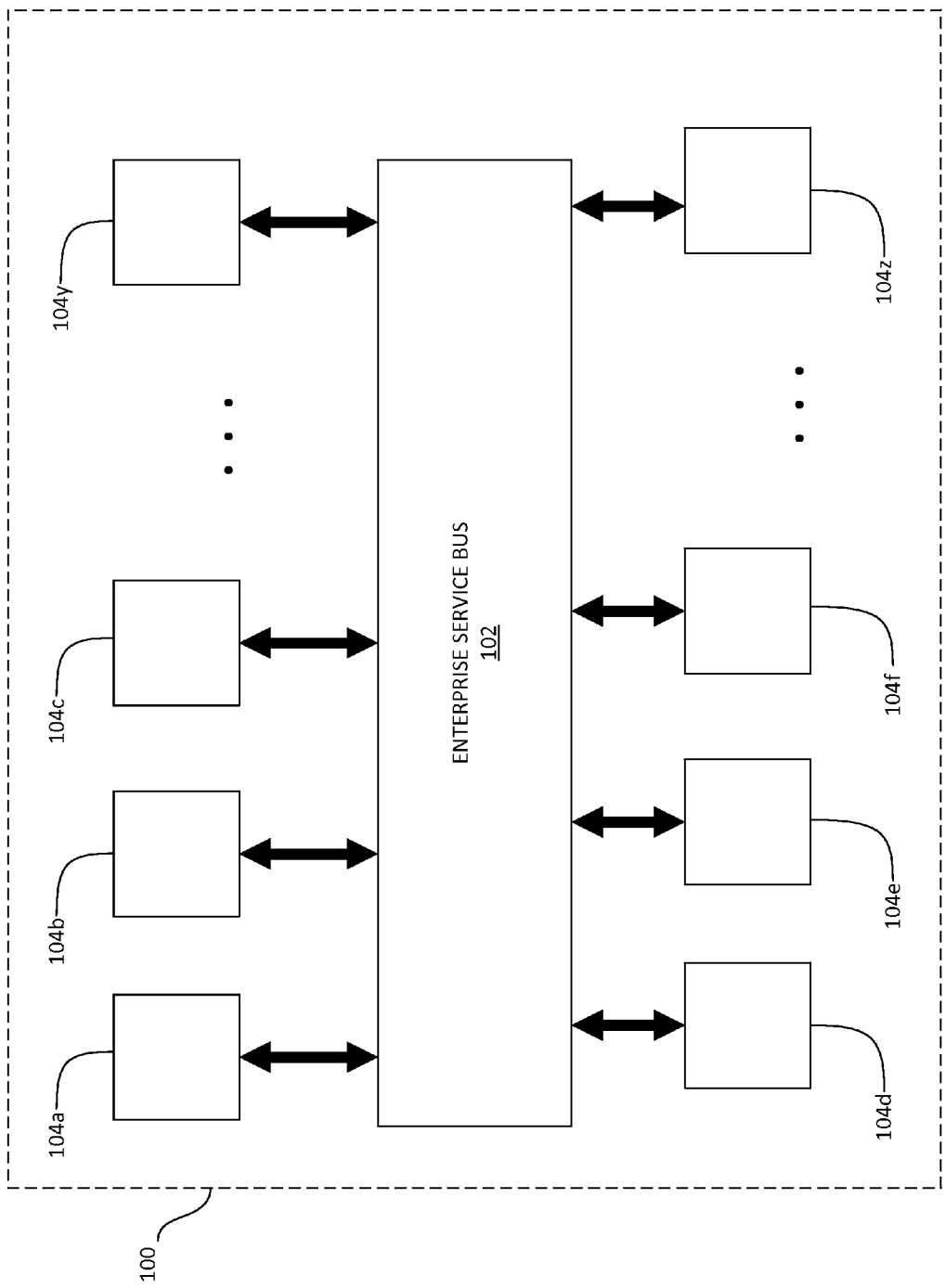
FIG. 1 is an example diagram of a service-oriented architecture in which embodiments of the technology of the present disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Mission critical systems, such as HP NonStop servers, are not immune to unauthorized access, compromises, cyber-attacks, or data breaches. These servers are used typically as the central component of debit and credit card processing, ATM networks, telephone exchanges, manufacturing, and other industries requiring extremely high availability and fault tolerance in their systems and applications.

Security Information and Event Management (SIEM) solutions provide event logging and processing functions for mission critical systems. SIEM solutions enable administrators to analyze security alerts generated by mission critical system hardware and software applications. Generally, SIEM solutions receive event logs generated by different mission critical hardware and software applications, e.g. a firewall component or a service application running on the mission critical system. Each event log records significant security events occurring within the system, and associated with the particular data source within the system. SIEM solutions normalize the information from the security event logs, enabling general-purpose queries. By applying rules to the normalized data, SIEM solutions can provide notifications of security threats within the system.

Current SIEM solutions, however, fail to provide sufficient protection against sophisticated attacks or data breaches exploiting built-in commands of the mission critical system. Mission critical systems are not immune to unauthorized access, compromises, cyber-attacks, or data breaches. Such attacks are becoming increasingly more sophisticated, exploiting vulnerabilities within mission critical systems through tactics designed to blend in as innocuous user actions. Current SIEM solutions are ill-equipped to address such sophisticated security incidents for several reasons.

For one reason, SIEM solutions operate on a per event basis, triggering an alert only when the number of occurrences of a particular event exceeds some threshold. Such thresholds, however, are binary—a notification is raised only if the threshold is exceeded. System administrators are notified of a security event occurring only after the damage is done. Moreover, only security events are logged and identified, ignoring other innocuous actions that may not be deemed a security issue. Greater information regarding the server—other types of non-security events and platform-specific information—is necessary to appreciate such patterns.

This need for greater information further identifies the limitations of current SIEM solutions. Current SIEM solutions are incapable of keeping pace with the exponentially increasing amount of data generated by mission critical systems. As stated above, SIEMs rely on collecting security event logs generated by security tools operating on the mission critical server. Today's big security data challenge requires evolving from traditional relational databases and time-based flat file systems that legacy SIEM solutions have leveraged as their core analytic capability. Traditional SIEMs are built on databases and architectures with inherent limitations in their ability to handle large volumes of events, historical data and extensions of relational data. They are limited in their ability to normalize all required attributes because they have to normalize across multiple devices, as well as lack context of their data source, especially for mission critical systems. This affects their analytical capabilities.

As recently as 2014, the mean time to detection (MTTD) for sophisticated security attacks and breaches was roughly 208 days. This is the result of the inability of existing solutions and security configurations to identify in, real-time, associations between various disparate events indicative of a security incident when performed in conjunction.

The technology of the present disclosure provides a method and system for detecting security incidents within mission critical systems in real-time and notifying system administrators. Not only are security events generated by agents within a mission critical system and platform-specific data related to the various applications, hardware, and subsystems aggregated within the system, the technology disclosed herein is capable of identifying patterns comprising normally unassociated user actions that, when viewed in context, are indicative of a security threat. Notifications are generated on an incident by incident basis—an incident being a pattern of disparate and unrelated events and user actions that, when contextualized, represent a pattern indicative of a security threat—as opposed to notifications based on a per event basis. Accordingly, embodiments of the technology disclosed in the present disclosure are capable of providing, in real-time, detection of sophisticated data breaches and "low and slow" attacks that current SIEM solutions are incapable of identifying.

Before describing the technology of the present disclosure in detail, an overview of an example environment in which embodiments of the technology may be implemented. FIG. 1 is an example service-oriented architecture (SOA) applicable for use within a mission critical server or system. This model was developed to provide a way of describing implementation of different software components, known as services, that are disparate and independent of each other. As illustrated in FIG. 1, a system 100 comprises a plurality of different software services 104a, 104b, 104c, 104d, 104e, 104f, 104y, 104z. Software services 104n (n being the total number of software services within a given system 100) may include various service nodes, including SIEMs. In some embodiments, the system 100 may comprise a single system, with each software service 104n is a software program loaded onto the system. The software services 104n may be separate systems of their own in other embodiments, such as a security service system operating on a different server and in communication with system 100 and the other software services through the enterprise service bus 102. The enterprise service bus 102 serves as the backbone of the system 100, providing message routing services between the different disparate and independent software services 104n.

The enterprise service bus 102 enables messages from each software service 104n to be routed throughout the system, without the different services from having knowledge of the existence of each other. It enables different software services 104n to be integrated into a system without requiring each application to have specific knowledge of the underlying constructs and specifics of each other application.

Having described an example environment in which embodiments of the technology disclosed herein may be implemented, a discussion of aspects of the technology disclosed shall be provided. For ease of discussion, the technology shall be described with reference to implementation with the HP NonStop server product line of fault-tolerant servers for mission critical systems. Although described with respect to the NonStop server platform, the technology of the present disclosure is applicable to any other fault-tolerant server system. Such discussion should not be interpreted as limiting the applicable scope of the technology disclosed herein.

Figure 2:
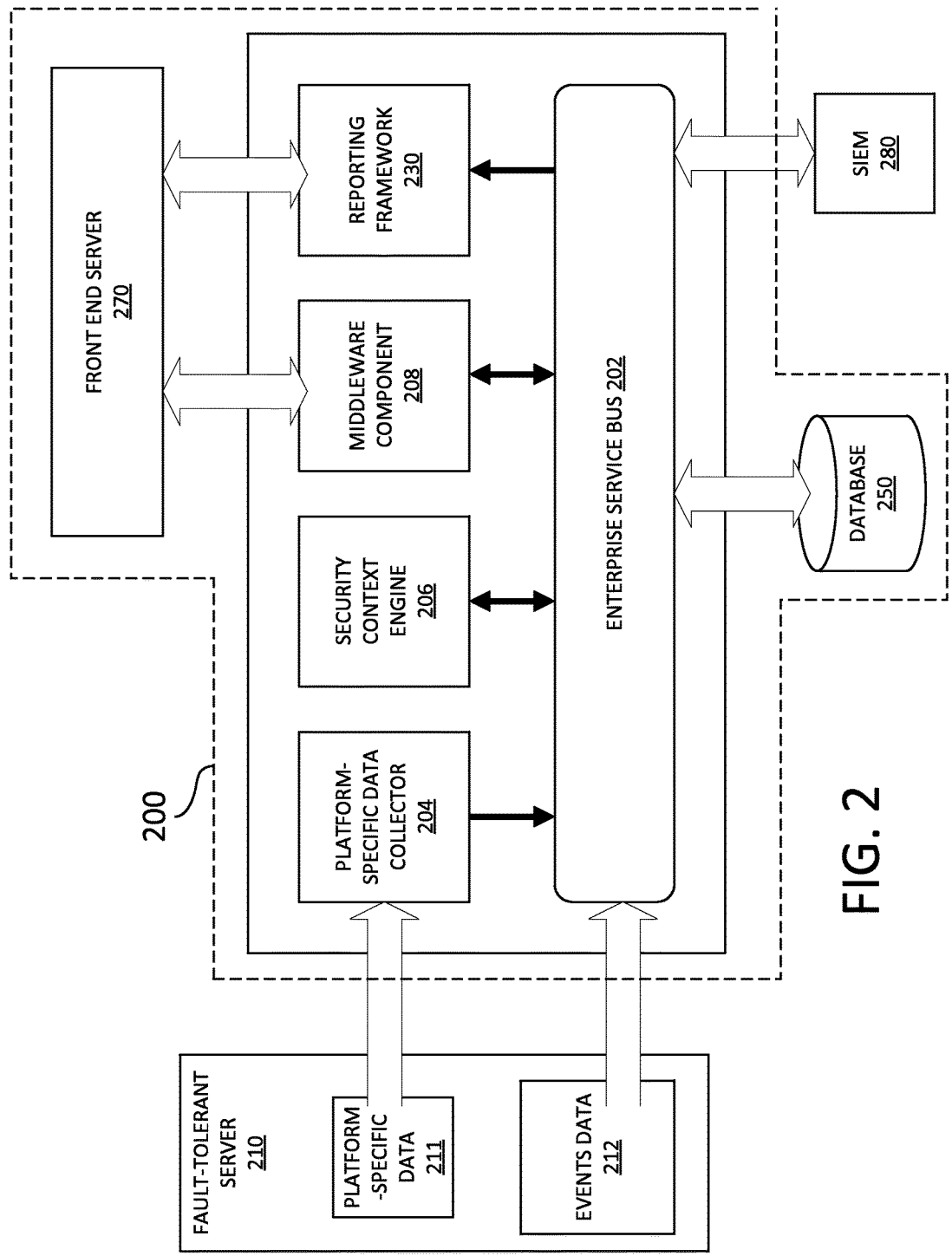
FIG. 2 is an example threat assessment system in accordance with embodiments of the technology of the present disclosure.

FIG. 2 illustrates an example embodiment of a threat assessment system 200 in accordance with the technology of the present disclosure. In the illustrated embodiment, the threat assessment system 200 includes a platform-specific data collector 204, a security context engine 206, a middleware component 208, reporting framework 230, front end server 270, database 250, and enterprise service bus 202. In various embodiments, the enterprise service bus 202 is similar to the enterprise service bus 102 described above with respect to FIG. 1. By employing an enterprise service bus 202, the threat assessment system 200 may be easily modified to include additional services, similar to the services discussed above with respect to FIG. 1, without affecting those services currently offered.

As illustrated, the threat assessment system 200 is communicatively coupled to the fault-tolerant server 210. As discussed above, for ease of discussion the fault-tolerant server will be treated as a NonStop server, but the technology is applicable to any other server designed for mission critical systems requiring fault tolerance and high uptime. The threat assessment system 200 may be connected to the fault-tolerant server 210 through one or more communications ports of the fault-tolerant server 210 in some embodiments. For example, the threat assessment system 200 may be connected to port 514 of a NonStop server, which is a UDP port for transmission of event log information using the syslog communication protocol.

In other embodiments, the threat assessment system may be a software service that is loaded and run on the fault-tolerant server 210. In such embodiments, the threat assessment system 200 may be configured to monitor messages transmitted over one or more communications ports of the fault-tolerant system, or routed internally within the system.

Components within the enterprise service bus 202 may be configured to collect a plurality of event data 212 generated within the fault-tolerant server 210. The enterprise service bus contains a series of adapters that marshal data between disparate applications and the bus. The event data 212 includes a collection of event logs generated by a number of disparate and unrelated components within the fault-tolerant server 210. Non-limiting examples of disparate and unrelated components within the fault-tolerant server 210 include: software applications running on the server; processing hardware; terminals connected to the fault-tolerant server; operating systems, either running on the fault-tolerant system or on a peripheral terminal or system connected therewith; other mission critical systems; or networking components; among others. In embodiments implemented in conjunction with a NonStop server, the disparate and unrelated components may further include XYPRO components providing a number of auditing, authorization, and management services, and the Safeguard subsystem. Safeguard is a subsystem included in the NonStop operating system that provides additional advanced security features. Event data 212 may be communicated in syslog or common event format (CEF) protocols in some embodiments.

In embodiments implemented within a NonStop server, security event logs may be collected from a XYPRO Merged Audit™ (XMA) node, a software component included within the NonStop server operating system configured to collect event logs from the several disparate event generation components (e.g., agents) operating within the NonStop server 210.

The platform-specific data collector 204 is a data collection tool designed to obtain information specific to the particular fault-tolerant server 210 with which the threat assessment system 200 is implemented. Platform-specific data 211 includes user actions and events other than security events logged by a log generation application or agent running within the fault-tolerant system. Platform-specific data 211 may include, in some embodiments, operational data concerning the internal hardware of the fault-tolerant server, such as CPU usage and memory usage. Various embodiments of platform-specific data 211 may include information regarding various data items, such as files, applications, processes, subsystems, internal and external databases, and network data, among others. Different attributes of such data items may be collected. Non-limiting examples of attributes of platform-specific data 211 may include: file format; maximum extents for a given data item; owner of a data item; security associated with the data item; creation date; last open; extents allocated; and whether and when data was modified. Other non-limiting examples of attributes of platform-specific data 211 associated with users include: when a user's access rights or accounts expire; when a user's password expires; how often a password must be changed within the system; log on metrics, such as last log on by a user, last unsuccessful log on attempt, and the count of failed log on attempts; whether and when a user's account was created and/or modified; and whether a user's account is frozen. This information is useful in providing context to events identified in the security event logs, enabling more robust analysis and pattern matching between disparate events.

The platform-specific data collector 204 scans through all the data items on the fault-tolerant server 210 and retrieves the platform-specific data 211 from the fault-tolerant server 210. In various embodiments, the platform-specific data collector 204 scans the raw data items on the fault-tolerant server 210 to retrieve the platform-specific data 211. In various embodiments, the platform-specific data collector 204 may comprise one or more collectors, each collector designed to scan and retrieve platform-specific data from a particular type of data item on the fault-tolerant server 210.

The platform-specific data 211 and the events data 212 obtained from the fault-tolerant server 210 are aggregated by the enterprise service bus 202 into a set of unassociated events information. In some embodiments, the enterprise service bus 202 may route the unassociated events information to a database 250 to store the information until it is ready for processing. In embodiments implementing real-time analysis, the enterprise service bus 202 may route the unassociated events information to the security context engine 206.

In order to identify sophisticated attacks, merely aggregating system information and applying rules (e.g., thresholds) to identify threats fails to detect the more sophisticated attacks discussed above. Normalization of information is useful for enabling the application of rules to identified events, but is insufficient to identify security threats presented by combinations of events data 212 and platform-specific data 211. This deficiency is partly to blame for the long MTTD. In the example embodiment illustrated in FIG. 2, the security context engine 206 is tasked with parsing through the set of unassociated events information and identifying one or more security incidents by applying a security context map to the data. Instead of identifying actual security threats based solely on events logged by security hardware and software, the example threat assessment system 200 applies business and security rules to the identified security incidents, enabling faster detection of security issues.

Figure 3:
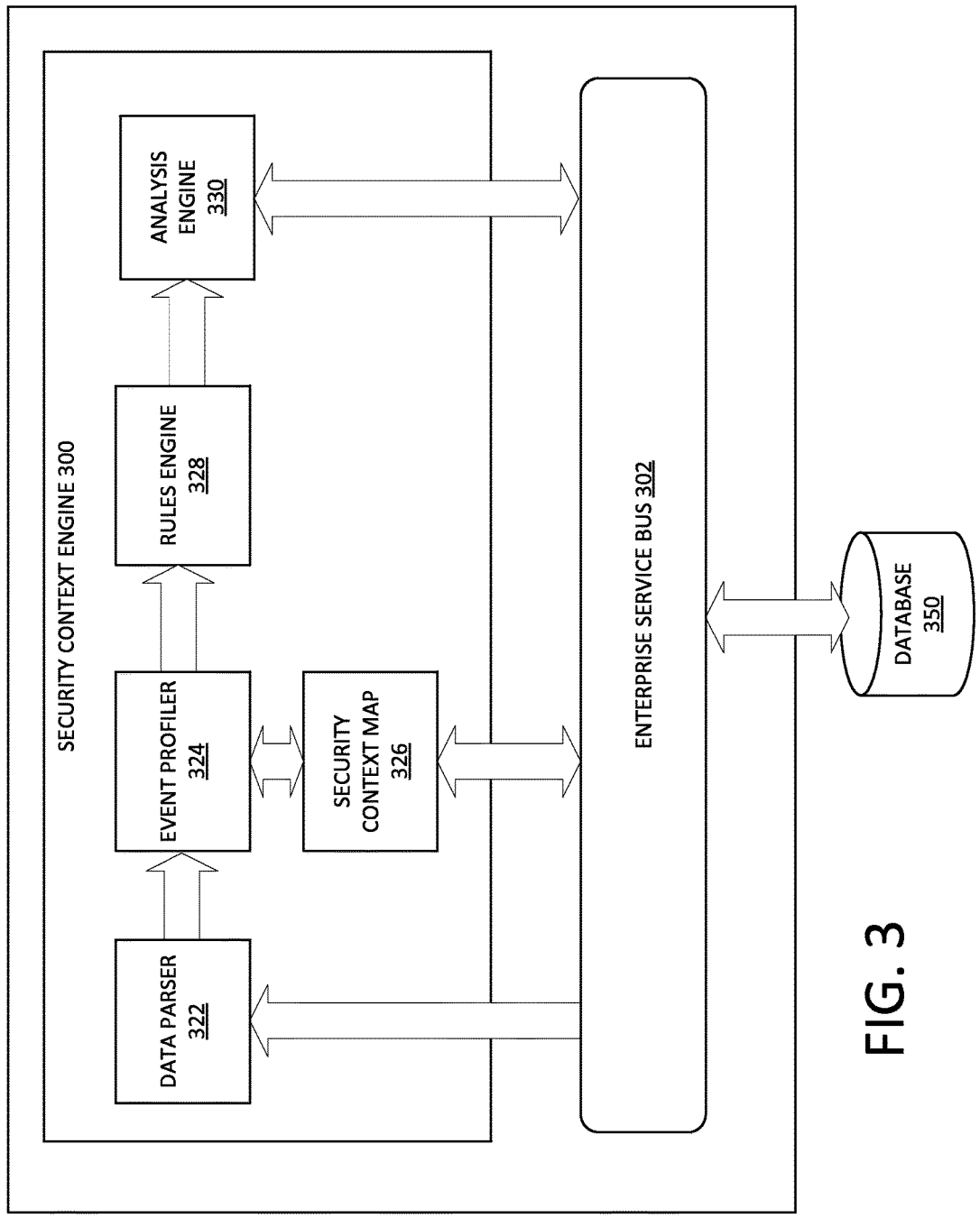
FIG. 3 is an example security context engine in accordance with embodiments of the technology of the present disclosure.

FIG. 3 illustrates the internal components of an example security context engine 300 in accordance with the technology of the present disclosure. For ease of discussion, FIG. 3 omits the other components of the threat assessment system 200 disclosed in FIG. 2. As illustrated in FIG. 3, the example security context engine 300 includes a data parser 322, an event profiler 324, a security context map 326, a rules engine 328, and an analysis engine 330. In other embodiments, more or less components may be included within the security context engine 300. Some embodiments may combine the different components into a single component; for example, the rules engine 328 and analysis engine 330 may be combined into a single component handling both functions.

Similar to other SIEM solutions, the threat assessment system 200 (of FIG. 2) performs a normalization process of the data, to populate the fields of the organization scheme with the information regarding each of the disparate events in the unassociated events data. The data parser 322 normalizes the unassociated events data. In some embodiments, the unassociated events data may be aggregated as raw messages from the fault-tolerant server 210. In such embodiments, the data parser 322 may include a transformer element for transforming the unassociated events data into a message format suitable for analysis by the security context engine 300. One example format to which the transformer of the data parser 322 may transform the unassociated events data may be a well-known industry format such as JSON. Other formats may be utilized in other embodiments, such as XML or a proprietary custom message, among others. Various embodiments may include a validation element within the data parser 322 as well, to ensure that the information populating the parsed data fields are valid. In some embodiments, the entire set of unassociated events data may be stored in a database 350.

The parsed unassociated events data may then be sent to an event profiler 324. The event profiler 324 takes the unassociated parsed data from the data parser 322 and categorizes the information. In various embodiments, the categorization may be based on the type of events data, such as user action or system action. In other embodiments, the categorization may be based on the disparate source from which such information was generated. Other embodiments may employ varied categorization schemes, based on the design. After categorization, the event profiler 324 may provide a security context to the information, such that security "incidents" may be identified. As discussed above, an "incident" is a pattern of disparate and unrelated events and user actions that represent a pattern indicative of a security threat. In various embodiments, the event profiler 324 may apply a security context map 326 to the parsed data. A security context map 326 is a set of relationships between different types of disparate information (i.e., events information or platform-specific information) that is utilized to create incidents. In various embodiments, the security context map 326 may include various weighting factors for different categories of information. Multiple weighting factors may be associated with a particular category in some embodiments, the applicable weighting factor being determined based on the presence of other categories of information being present in the data set. In various embodiments, the event profiler 324 may pull the security context map 326 from a database 350. In other embodiments, the security context engine 300 may maintain a security context map 326, which may be updated by polling the database 350 for updated contexts or through predictive analytics implemented in the security context engine 300.

After applying the security context map 326 and identifying one or more security incidents, the event profiler 324 may send the contextualized events data to the rules engine 328. The rules engine 328 may filter the contextualized events data based on a set of implementation-specific threat assessment rules. Threat assessment rules are business and security rules generated by the system user, specific to the particular implementation of the threat assessment system. In some embodiments, the threat assessment rules may be generated by the threat assessment system. The threat assessment rules may, in some embodiments, include event-based rules and/or incident-based rules. Event-based rules may be similar to common security and business rules utilized in common SIEM solutions (e.g., thresholds associated with a particular event). Incident-based rules relate the different events-based rules for categorized data identified in the security incident such that a security alert may be generated based on incidents. In some embodiments, the incident-based rules may be similar to the security context. By filtering the contextualized data using the threat assessment rules, the rules engine 328 can remove "noise" from the parsed contextualized data. That is, items of information that are not relevant to the particular implementation-specific threat assessment rules of the fault-tolerant server can be removed, streamlining the analysis process to be discussed with respect to the analysis engine 330.

The threat assessment rules may be maintained in the database 350 and loaded into the rules engine 328 at startup of the system, or the rules engine 328 may query the database 350 for the applicable rules.

The relevant pieces of the parsed contextualized events data, identified security incidents, and user-generated rules are sent to an analysis engine 330, which is tasked with analyzing all the contextualized events data and security incidents to identify security breaches. The analysis engine 330 applies user-generated rules to the contextualized events data and security incidents to determine whether a breach has occurred. In some embodiments, the analysis engine 330 and rules engine 328 may be combined into a single component. In various embodiments, the analysis engine 330 may flag identified security breaches for creation of a security alert notifications. The analysis engine 330 may send the results from applications of the different rules to the database 350, in some embodiments, for storage.

Referring back to FIG. 2, the threat assessment system 200 may further include a middleware component 208 and a reporting framework 230. The middleware component 208 provides an interface to the threat assessment system 200 through an external front end server 270 in some embodiments. Where the threat assessment system 200 is incorporated into the operating system of the fault-tolerant server in some embodiments, the middleware component 208 may provide an interface thru a terminal attached to the fault-tolerant server. In some embodiments, the middleware component may include an evaluation tool for querying the database 250 and/or the security context engine 206 to perform analysis of the aggregated and contextualized information. In some embodiments, the middleware component 208 may format the results of the evaluation into a visual format for display to system administrators on a computer display. In some embodiments, the front end server 270 may be a web server, enabling system administrators to review results from the threat assessment system 200 via the middleware component 208 from any computing device with Internet access through a web portal, or through an application running on a computing device. Some non-limiting examples of computing devices include: desktops; laptops; smartphones; PDAs; tablets; smartwatches; or Internet-connected devices. The middleware component 208, in some embodiments, may identify the method of delivering notifications to system administrators, which may be delivered to any of the devices listed above.

The reporting framework will allow for report generation usable by multiple roles, such as management reports, auditor reports, summary reports and other types of necessary reports based on security and application data. The framework itself will contain a report creation wizard, customizable report templates, data sorting and report generation for audits, forensic analysis and integration with other reporting engines.

Although providing robust security notifications alone, embodiments of the threat assessment system in accordance with the present disclosure can be implemented in conjunction with current SIEM solutions. As illustrated in FIG. 2, the example threat assessment system 200 may be in communication with one or more SIEMs 280. In some embodiments, the threat assessment system 200 may sit in between the fault-tolerant server 210 and the SIEM 280, with the enterprise service bus 202 serving as a conduit to route events data 212 to the SIEM 280.

Figure 4:
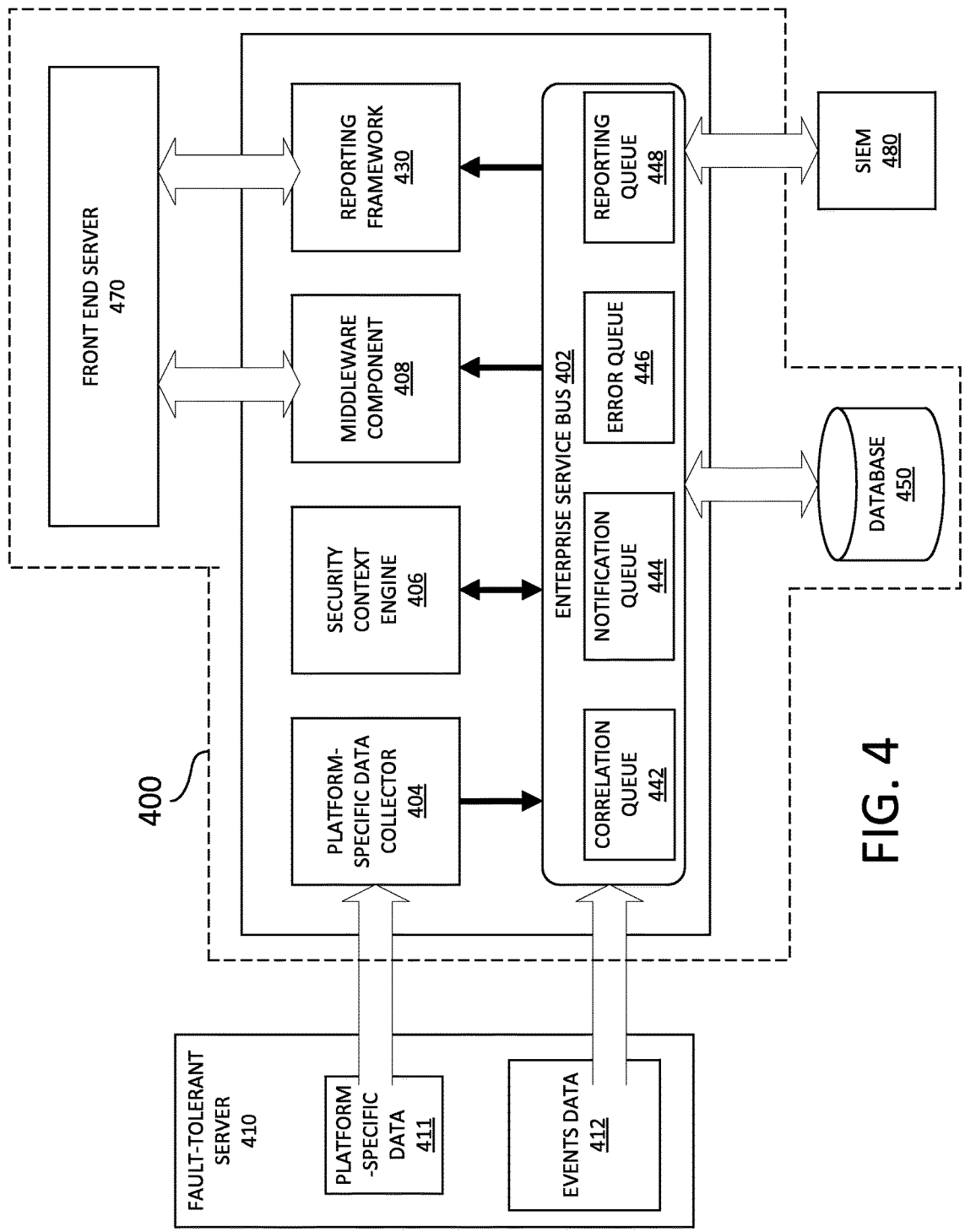
FIG. 4 is another example threat assessment system in accordance with embodiments of the technology of the present disclosure.

In some embodiments, the use of various queues may be beneficial for the overall functioning of the threat assessment system. FIG. 4 illustrates another example threat assessment system 400 in accordance with the technology of the present disclosure. As illustrated, the threat assessment system 400 includes all the same components as the threat assessment system 200 discussed with respect to FIG. 2. In addition, threat assessment system 400 includes a set of queues: a correlation queue 442; a notification queue 444; an error queue 446; and a reporting queue 448. The correlation queue 442 may be used to hold the parsed unassociated events data until needed by the event profiler of the security context engine 406. The notification queue 444 may be used to maintain system notifications, whether a security incident notification or an alert regarding the operation of the threat assessment system 400, until such notifications are capable of being transmitted. Some non-limiting methods of notification include email, SMS, SMNP messages, or other messaging methods. In some embodiments, the notification queue 444 may also maintain messages to be sent to SIEM solutions used in conjunction with the threat assessment system, such as messages containing the parsed unassociated events data and/or contextualized events data. In some embodiments, the notification queue 444 may be configured to generate the notifications. In other embodiments, the analysis engine of the security context engine 406 may generate the notification and send it to the notification queue 444.

The error queue 446 may maintain error messages generated by the different components of the threat assessment system 400. For example, if an error occurs during the normalization process by the data parser discussed above with respect to FIG. 3, the error queue may maintain that information until a system administrator is able to address the problem. The reporting queue 448 may maintain audit data and reporting statistics related to the threat assessment system 400 and its operation.

The use of queues alleviates some of the issues associated with high volume transactions. Information can be maintained for a time in a queue until the respective entity tasked with handling the information is able to properly assess the information. Moreover, queues enable asynchronous processing, accounting for delays that may arise in processing the information. Although illustrated as being contained within the enterprise service bus 402, the different queues 442, 444, 446, 448 may be located within different components of the threat assessment system 400 in other embodiments. For example, the error queue 446 may be included within the security context engine 406.

Unlike the per event based notification of the current solutions, the embodiments of the technology disclosed herein can provide more sophisticated incident detection by identifying relationships between disparate events, but also can provide an alternative to the binary notification of a threshold or counter system. As discussed above, the embodiments of the present technology utilizes threat assessment rules. These threat assessment rules take into account multiple events and the relationship between them, not the mere number of times an event occurred, enabling embodiments of the technology of the present disclosure to provide gradual threat levels associated with identified patterns. This provides a real-time indication of potential issues, not merely the fact that a security event has actually occurred.

Figure 5A:
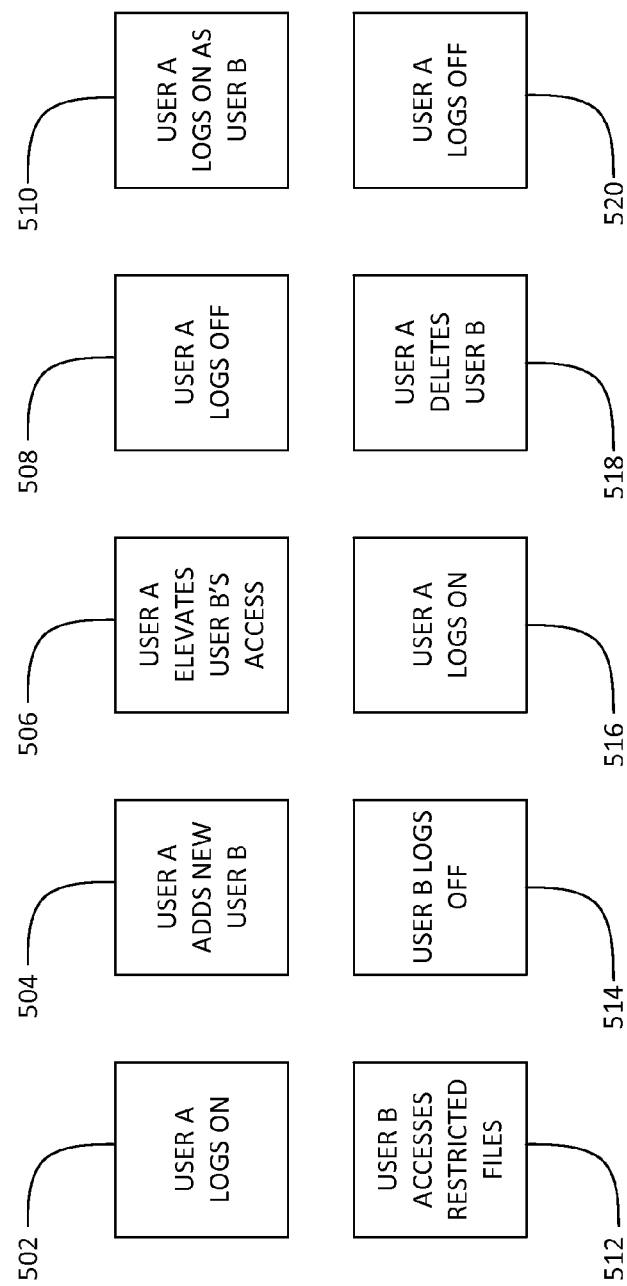
FIGS. 5A and 5B are visual examples of incident patterns in accordance with the technology of the present disclosure
Figure 5B:
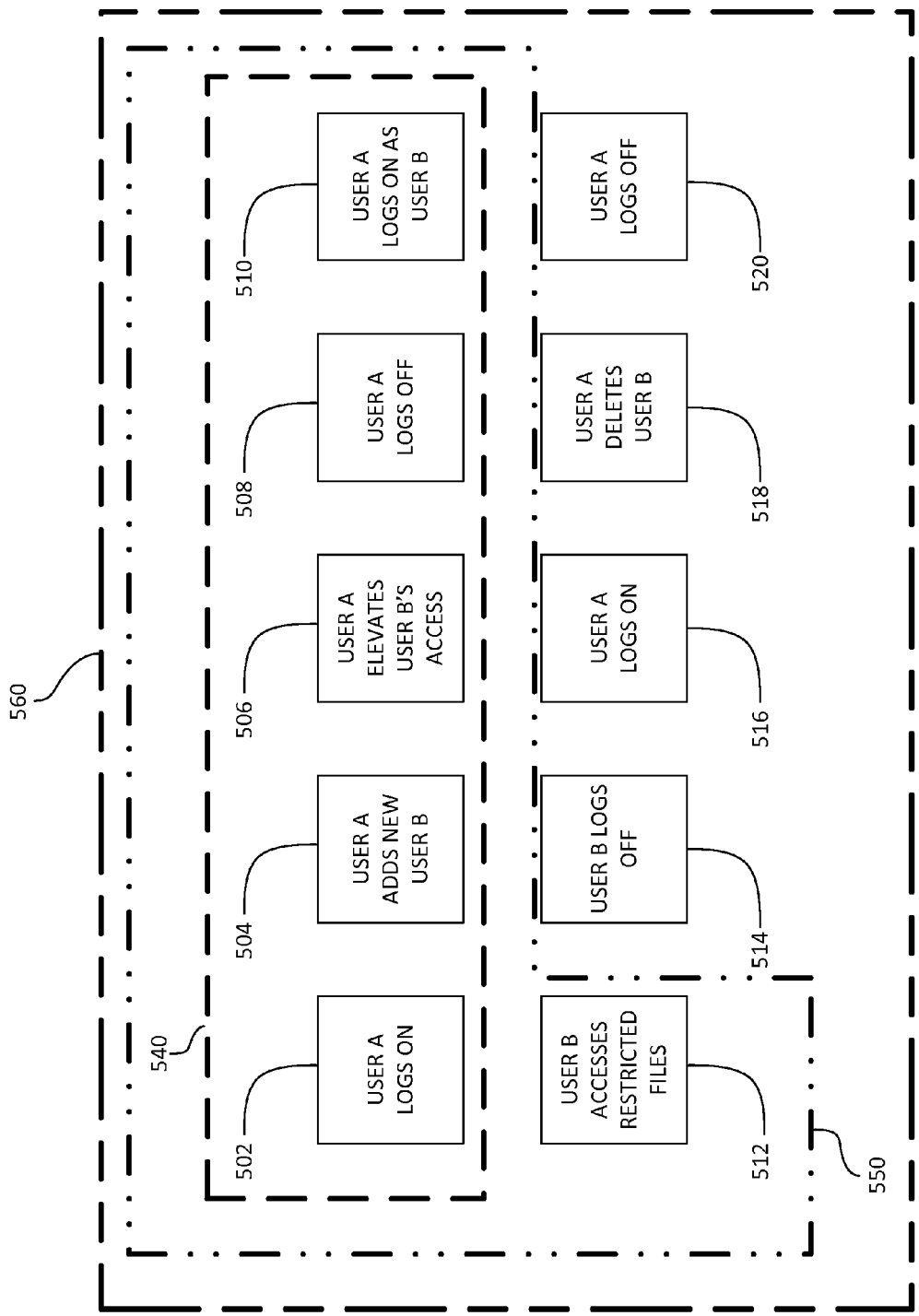

FIGS. 5A and 5B illustrate the ability of embodiments of the present disclosure to provide real-time gradient assessments of security threats. FIG. 5 illustrates a series of unassociated, unrelated, disparate events: multiple user login actions 502, 508, 510, 514, 516, 520; management activities regarding users 504, 506, 518; and restricted file access 512. Each of these events is, independently, innocuous user action that may be taken within normal business information. Current SIEMs would fail to be able to contextualize this information together to identify that the actions of user A in 504, 506 may be less innocuous than originally expected due to the events occurring in 508, 510, 512. A SIEM would see the event log, listing that a user (user B) accessed restricted files 512. Moreover, if the SIEM collected authentication audit data as well, the SIEM would see that user A and user B were both authenticated and permitted proper credentials 502, 510, 516 to access the system. None of these actions, individually, would exceed any threshold related to login attempts or unauthorized access of restricted files.

FIG. 5B illustrates how embodiments in accordance with the technology of the present disclosure would be able to assess the potential security threat. As illustrated in FIG. 5B, the same disparate events have occurred. However, by identifying different patterns of events, different threat levels can be triggered. For example, assume that there is a security context map that states when events 502, 504, 506, 508, 510, 512, 514, 516, 518, 520 occur, a security incident has occurred. Pattern matcher 326 discussed above with respect to FIG. 3 identifies pattern 540 from the unassociated events data. When pattern 540 is evaluated against the above described rule, it is clear that half of the events have already occurred. Accordingly, there is a potential for a security incident to be occurring. However, nothing overly suspicious has occurred yet. Accordingly, embodiments of the technology can generate a notification indicating a low potential that something nefarious may be ongoing. When the pattern matcher 326 identifies pattern 550, the threat level may be increased, generating a new notification indicating the heightened potential. And when the pattern matcher 326 identifies pattern 560, the threat assessment system can identify that a security event has occurred and provide a critical alert. Some non-limiting examples of notification methods include: visual indications, such as color codes or symbols; textual indicators; audible alerts; or a combination thereof. Moreover, some embodiments may transmit notifications via different notification methods, such as, but not limited to, SMS, email, automatic phone call, SNMP messaging, or other messaging method.

As discussed above, the advantage of the technology disclosed herein arises from the contextualization of disparate, unrelated events through the use of a security context map. Moreover, incident-based rules may be created based on the security context, which identify the incident patterns used to analyze the unassociated events data. The threat assessment system enables granular, real-time threat assessment because of the aggregation of not only specific events, but of all relevant events and platform-specific information—such as current operational status, attributes of files, hardware, and applications, and other platform data—such that the context in which events occur may be taken into account.

The security context map and incident-based rules may be identified and developed prior to implementation of the threat assessment system, and stored in a database, like the databases disclosed in FIGS. 2, 3, and 4.

Figure 6:
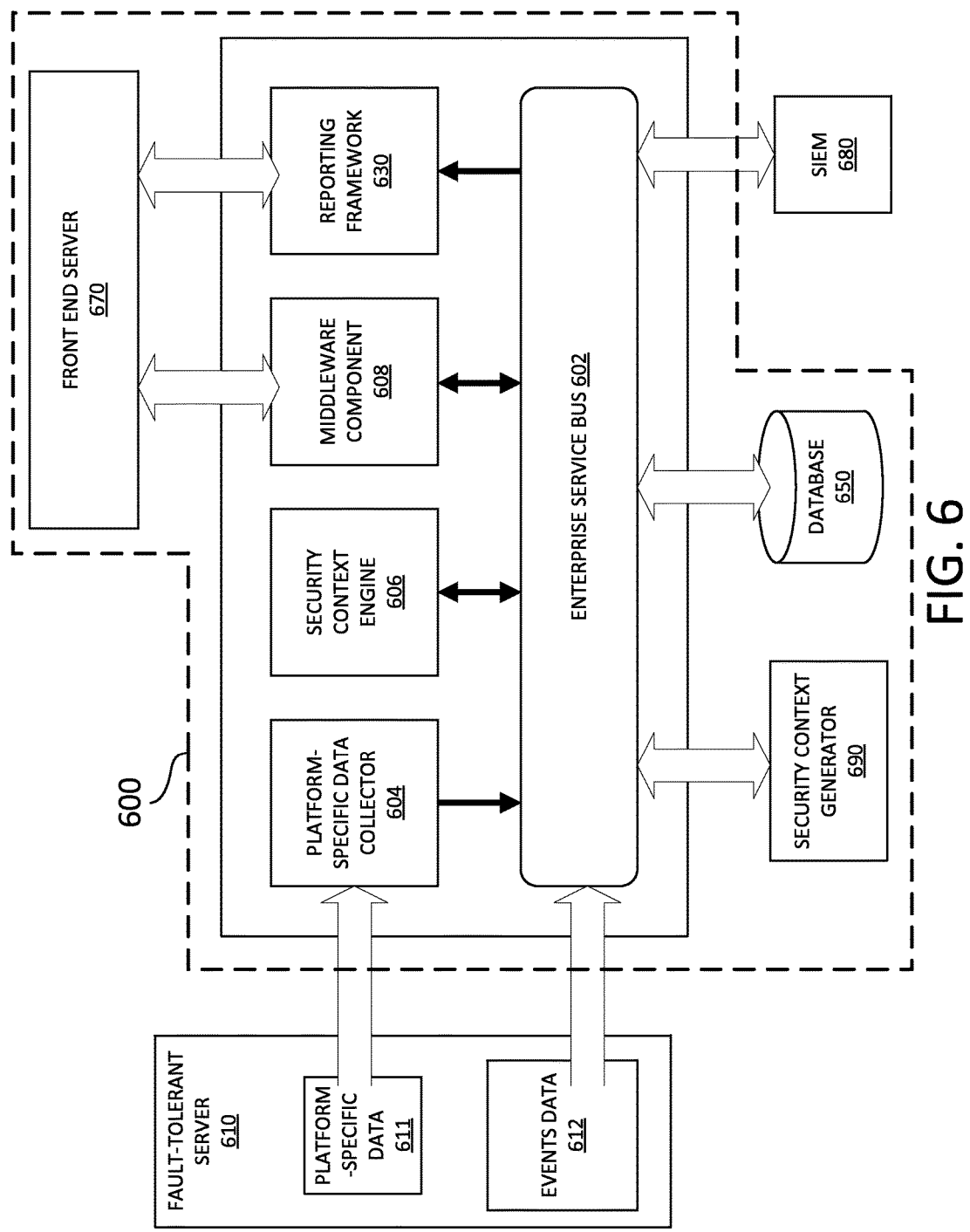
FIG. 6 is another example threat assessment system enabling dynamic threat assessment rule generation in accordance with embodiments of the technology of the present disclosure.

In other embodiments, the security context map and incident-based rules may be generated dynamically, taking advantage of the real-time analysis of the unassociated events data. FIG. 6 illustrates an example threat assessment system 600 including a real-time security context generator 690 in accordance with embodiments of the present disclosure. As shown in FIG. 6, the threat assessment system 600 contains many of the same components as the threat assessment system 200 discussed above with regards to FIG. 2. In addition, a security context generator 690 is shown, which is designed to analyze the unassociated events data aggregated by the enterprise service bus and information previously stored in the database 650 to identify relationships between disparate events and platform-specific data. The security context generator 690 leverages predictive analytics to understand the impact certain events and actions have on others from different sources to generate a security context map and/or incident-based rules.

As the enterprise service bus 602 aggregates the collected information into the unassociated events data, it sends the unassociated events data to the security context generator 690 in some embodiments. In various embodiments, the security context generator 690 may obtain previously stored information from database 650. Non-limiting examples of previously stored information the security context generator 690 may obtain include: past security context maps; event-based rules; prior incident-based rules; or past aggregated data. The security context generator 690 analyzes the unassociated events data to identify unappreciated relationships between different disparate events and actions by identifying the impact of a pattern of events on the fault-tolerant server 610. In some embodiments, the security context generator 690 may also analyze the unassociated events data in view of platform-specific security parameters, such as a security risk profile associated with certain types of data breaches. In this way, the security context generator may create an algorithm based on an identified pattern to utilize in determining the threat level to assign, as discussed above with regards to the FIGS. 5A and 5B.

For example, the security context generator 690 may identify that multiple failed logins within in a given period of time is an indication of a security threat. The security context generator 690 may generate the following algorithm:

$$b = \frac{x(n)}{y}, \quad (1)$$

where x is the event (failed login), n is the number of times the event occurred, and y is the period.

Another example security context may be generated based on pattern 540 discussed above with regards to FIG. 5B, where user A created a new user, B, with a higher security clearance and then user A logs on as user B:

$$i = \frac{(x \cup e) \cup z}{y}, \quad (1)$$

where x represents the first event (user A adds user B), e represents the second event (user A elevates user B's security access), z represents the third event (user A logs on as user B), y is the period within which the events occurred, and i represents an action to be taken. In some embodiments, i may be to generate a low level notification, as discussed above with respect for FIG. 5B.

Once the security context generator identifies a new security context map incident-based rule indicative of a security incident not previously addressed, the security context generator 690 may generate one or more incident-based rules in view of the security context map, in some embodiments. The security context generator 690 may send the security context map and incident-based rules to the security context engine 606 via the enterprise service bus 602, so that the new security context map and/or incident-based rules may be available to the event profiler and/or rules engine, respectively, as discussed above with respect to FIG. 3. In various embodiments, the security context generator 690 may send the new security context map and/or incident-based rules to the database 650 to be stored until pushed to the event profiler and/or rules engine or pulled from the database 650.

Although discussed with respect to the example service oriented architecture discussed above with respect to FIG. 1, the embodiments of the technology disclosed herein is not limited to such architecture. In some embodiments, the enterprise service bus may be replaced by a communication component that enables the threat assessment system to collect event logs generated within the fault-tolerant server. Each component of the threat assessment system may be in direct communication with all the other components, or only those components that require the information provided by a respective component.

The technology of the present disclosure is also not limited to implementation as a software service system. In some embodiments, the threat assessment system may be a peripheral component connected to one or more communication ports of the fault-tolerant server to collect the necessary data.

Figure 7:
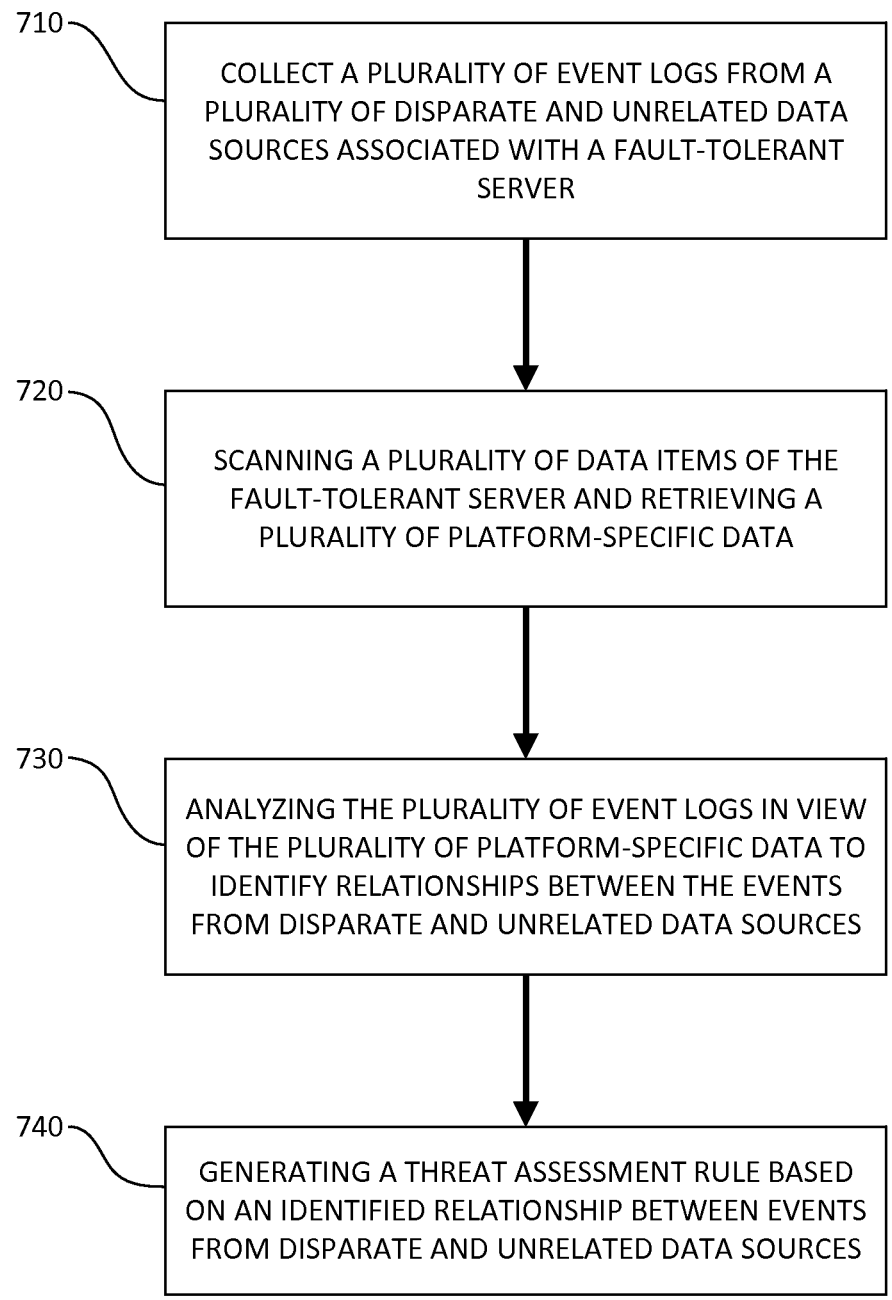
FIG. 7 is a flow diagram of an example threat assessment rule generation method in accordance with technology of the present disclosure.

To reiterate, the benefits of the technology disclosed herein arise from the ability to aggregate and contextualize disparate and unrelated events in a way that current solutions are incapable of doing. FIG. 7 is a flow diagram illustrating a method of identifying relationships between disparate events. The example method illustrated in FIG. 7 may be conducted in real-time, in a manner similar to that discussed above with respect to the threat assessment rule generator of FIG. 6.

At 710, a plurality of event logs from a plurality of disparate and unrelated components associated with a fault-tolerant server are collected. The collection of event logs may occur in a similar fashion as that discussed above with respect to FIGS. 1 and 2. Non-limiting examples of disparate and unrelated components associated with the fault-tolerant server include: software applications running on the server; processing hardware; terminals connected to the fault-tolerant server; operating systems, either running on the fault-tolerant system or on a peripheral terminal or system connected therewith; other mission critical systems; or networking components; among others. In embodiments implemented in conjunction with a NonStop server, the disparate and unrelated components may further include XYPRO components providing a number of auditing, authorization, and management services, and the Safeguard subsystem. In embodiments implemented within a NonStop server, security event logs may be collected from a XYPRO Merged Audit™ (XMA) node, a software component included within the NonStop server operating system configured to collect event logs from the several disparate event generation components (e.g., agents) operating within the NonStop server.

A plurality of data items of the fault-tolerant server are scanned at 720 to retrieve a plurality of platform-specific data. Platform-specific data may be obtained in a manner similar to that discussed above with respect to FIG. 2. Platform-specific data are more than simply security events logged by a log generation application or agent running within the fault-tolerant system. Platform-specific data may include, in some embodiments, operational data concerning the internal hardware of the fault-tolerant server, such as CPU usage and memory usage. Various embodiments of platform-specific data may include information regarding various data items, such as files, applications, processes, subsystems, internal and external databases, and network data, among others. Different attributes of such data items may be collected.

At 730, the plurality of event logs are analyzed in view of the platform-specific data to identify relationships between the disparate and unrelated events from the disparate and unrelated components associated with the fault-tolerant server. A "relationship" is a pattern of events that are indicative of a potential or ongoing security threat. In some embodiments, the analysis may also take into account for platform-specific security parameters, such as a security risk profile associated with certain types of data breaches. Based on the analysis, a threat assessment rule is generated based on an identified relationship between disparate and unrelated events from disparate and unrelated components of the fault-tolerant server at 740.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 8:
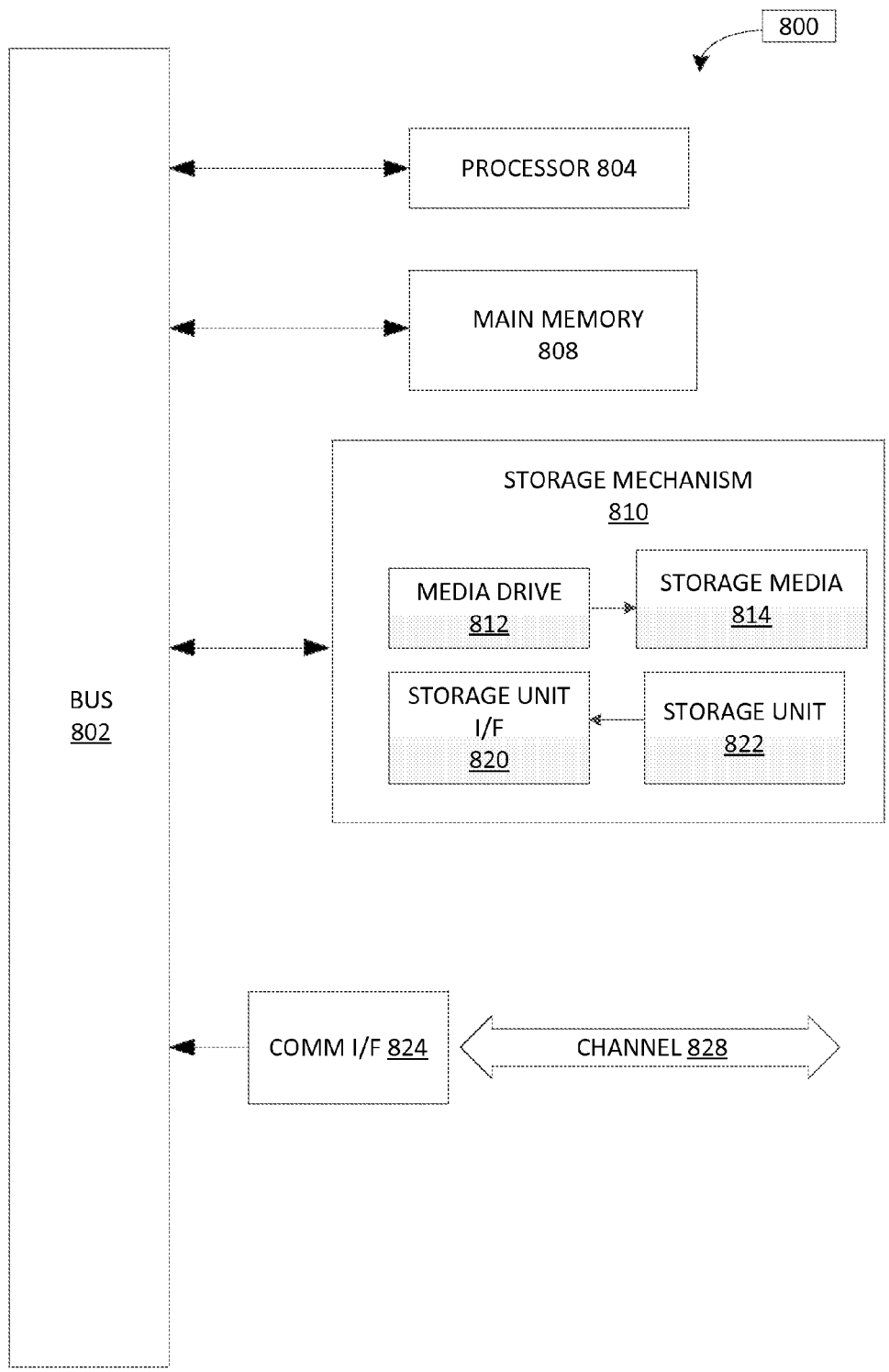
FIG. 8 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the technology using other computing components or architectures.

Referring now to FIG. 8, computing component 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 800 might include, for example, one or more processors, controllers, control components, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing component 800 or to communicate externally.

Computing component 800 might also include one or more memory components, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot, a PCMCIA slot and card, and other fixed or removable storage units 822 and interfaces 820 that allow software and data to be transferred from the storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of gathering and contextualizing multiple security events in a fault-tolerant server, comprising:
   collecting a plurality of event logs generated by a plurality of disparate and unrelated event-generation components associated with the fault-tolerant server;
   scanning a plurality of data items from the plurality of event logs within the fault-tolerant server and retrieving a plurality of platform-specific data related to the plurality of data items, the platform-specific data comprising user actions and attributes of one or more users and data items other than security events logged by a log generation application or agent running within the fault-tolerant server;
   aggregating the plurality of event logs and the plurality of platform-specific data into a plurality of unassociated events data;
   routing the plurality of unassociated events data to a security context engine;
   contextualizing, by the security context engine, the plurality of unassociated events data to identify a previously unidentified incident pattern in real-time, generating threat assessment rules based on a security context, wherein contextualizing comprises:
     parsing the plurality of unassociated events data in real-time to categorize information included within the plurality of unassociated events data into different category types to generate contextualized events data, and sending the contextualized events data to a database; and
     applying, by an event profiler, a security context map in real-time to the contextualized events data to identify a security incident and sending the identified security incident to an analysis engine, wherein the security context map identifying relationships between one or more category types and a weighting factor for the one or more category types, wherein the security context map includes a set of relationships between security events data and platform-specific data comprising user actions and events other than security events logged by a log generation application or agent running within the fault-tolerant server;
   evaluating, by the analysis engine, the identified security incident against one or more of the threat assessment rules in the database, by:
     identifying the one or more threat assessment rules associated with the fault-tolerant server; and
     comparing the identified security incident against each of the one or more threat assessment rules; and
   generating a security notification if at least one of the one or more of the threat assessment rules indicates a security threat, based on the identified security incident.

2. The method of claim 1, wherein the plurality of disparate and unrelated event-generation components of the fault-tolerant server comprising one or more of: software applications running on the server; processing hardware; terminals connected to the fault-tolerant server; software agents running on the fault-tolerant server or other mission critical systems; operating systems, either running on the fault-tolerant system or on one or more peripheral terminals or systems connected therewith; other mission critical systems; or networking components.

3. The method of claim 2, wherein the fault-tolerant server is a NonStop server, and the plurality of disparate and unrelated event-generation components of the fault-tolerant server further comprises one or more of: XYGATE components; or a Safeguard subsystem.

4. The method of claim 1, further comprising:
   a service bus receiving the plurality of event logs and the plurality of platform-specific data.

5. The method of claim 1, wherein identifying the one or more threat assessment rules comprising: retrieving the identified one or more threat assessment rules stored within the database; and sending the retrieved one or more threat assessment rules to a rules engine.

6. The method of claim 1, wherein identifying the one or more threat assessment rules comprising: sending the unassociated events data to a security context generator, analyzing the plurality of event logs against the plurality of platform-specific data; and generating the threat assessment rules based on the analyzing.

7. The method of claim 6, further comprising: retrieving a set of security parameters associated with the fault-tolerant server from the database; analyzing the plurality of event logs against the plurality of platform-specific data and the set of security parameters; and generating a threat assessment rule based on the analyzing.

8. The method of claim 6, further comprising storing the generated threat assessment rule in the database.

9. The method of claim 1, wherein each threat assessment rule is associated with a threat value, and generating the security notification comprises generating a threat level indicator based on the threat value determined by the evaluation.

10. The method of claim 1, wherein the retrieved platform-specific data comprises operational data concerning internal hardware of the fault-tolerant server.

11. The method of claim 10, wherein the operational data comprises data concerning CPU usage or memory usage.

12. The method of claim 1, wherein the retrieved platform-specific data comprises data regarding at least one of the following: files, applications, processes, and databases.

13. The method of claim 12, wherein the retrieved platform-specific data comprises data regarding at least one of the following: a file format, data regarding an owner of a data item, a creation date, number of extents allocated, whether and when data was modified, and security associated with a data file.

14. The method of claim 1, wherein the retrieved platform-specific data comprises data regarding at least one of the following: when a user's access rights or account expires, when a user's password expires, how often a password must be changed within a system, and when a user's account was created or modified.

15. The method of claim 14, wherein the retrieved platform-specific data comprises data regarding when a user's account was created or modified.

* * * * *